US011659258B2

(12) United States Patent
Furukawa et al.

(10) Patent No.: US 11,659,258 B2
(45) Date of Patent: May 23, 2023

(54) PROGRAM PRODUCTION METHOD, PROGRAM PRODUCTION APPARATUS, AND RECORDING MEDIUM

(71) Applicant: BOND Co., Ltd., Kitakyushu (JP)

(72) Inventors: Hiromi Furukawa, Fukuoka (JP); Hiroyuki Sato, Fukuoka (JP); Ryuji Takase, Fukuoka (JP)

(73) Assignee: BOND Co., Ltd., Fukuoka (JP)

( * ) Notice: Subject to any disclaimer, the term of this patent is extended or adjusted under 35 U.S.C. 154(b) by 0 days.

(21) Appl. No.: 17/637,314

(22) PCT Filed: Aug. 27, 2020

(86) PCT No.: PCT/JP2020/032442
§ 371 (c)(1),
(2) Date: Feb. 22, 2022

(87) PCT Pub. No.: WO2021/039925
PCT Pub. Date: Mar. 4, 2021

(65) Prior Publication Data
US 2022/0279228 A1    Sep. 1, 2022

(30) Foreign Application Priority Data

Aug. 29, 2019 (JP) .............................. JP2019-157209
Jan. 29, 2020 (JP) .............................. JP2020-012558

(51) Int. Cl.
*H04N 21/266* (2011.01)
*H04N 21/854* (2011.01)
(Continued)

(52) U.S. Cl.
CPC ......... *H04N 21/854* (2013.01); *H04N 21/234* (2013.01); *H04N 21/266* (2013.01); *H04N 21/8545* (2013.01); *H04N 21/85406* (2013.01)

(58) Field of Classification Search
None
See application file for complete search history.

(56) References Cited

U.S. PATENT DOCUMENTS 6,362,855 B1    3/2002   Watanabe
11,430,485 B2 *  8/2022   Wang ..................... H04N 21/84
(Continued)

FOREIGN PATENT DOCUMENTS

EP    1499124 A2    1/2005
JP    11-252457 A   9/1999
(Continued)

OTHER PUBLICATIONS

International Search Report (ISR) dated Oct. 6, 2020 filed in PCT/JP2020/032442.

*Primary Examiner* — Junior O Mendoza
(74) *Attorney, Agent, or Firm* — Rankin, Hill & Clark LLP (57) ABSTRACT

The present invention proposes a program production method or the like that is suitable for generating a program according to a change in situation. In a program production apparatus 3, a program production unit 21 generates a program using material data. A basic script storage unit 11 stores a basic script. In a stage in which the generation of the program is started, the program production unit 21 generates the program according to the basic script. Subsequently, the program production unit 21 gradually modifies the basic script using dynamic data (e.g., a user's instruction, information collected in a real-time manner, etc.), so as to generate a program suitable for the situation of the material data, viewers, or the like. This enables the provision of even live broadcasting with a small number of users. Also, this allows emergency broadcasting to be automatically provided according to situation.

19 Claims, 5 Drawing Sheets

(51) Int. Cl.
H04N 21/234 (2011.01)
H04N 21/8545 (2011.01)

(56) References Cited

U.S. PATENT DOCUMENTS

| | | | |
|---|---|---|---|
| 2003/0084457 A1* | 5/2003 | Lee | G10L 13/00 |
| | | | 348/E7.071 |
| 2005/0012761 A1 | 1/2005 | Shiomi et al. | |
| 2005/0041159 A1 | 2/2005 | Nakamura et al. | |
| 2009/0184963 A1 | 7/2009 | Shiomi et al. | |
| 2011/0074815 A1 | 3/2011 | Shiomi et al. | |
| 2013/0124984 A1* | 5/2013 | Kuspa | H04N 9/475 |
| | | | 715/255 |
| 2013/0151970 A1* | 6/2013 | Achour | G06Q 10/101 |
| | | | 715/723 |
| 2014/0002464 A1 | 1/2014 | Furukawa et al. | |

FOREIGN PATENT DOCUMENTS

| | | | |
|---|---|---|---|
| JP | 2001-53696 | A | 2/2001 |
| JP | 2001-186485 | A | 7/2001 |
| JP | 2004-120114 | A | 4/2004 |
| JP | 2005-6229 | A | 1/2005 |
| JP | 2005-39794 | A | 2/2005 |
| JP | 2005-210541 | A | 8/2005 |
| JP | 2008-118468 | A | 5/2008 |
| JP | 2009-159529 | A | 7/2009 |
| JP | 4725918 | B2 | 7/2011 |
| JP | 4725936 | B1 | 7/2011 |
| JP | 2014-233049 | A | 12/2014 |
| JP | 2018-7010 | A | 1/2018 |

* cited by examiner

PROGRAM PRODUCTION METHOD, PROGRAM PRODUCTION APPARATUS, AND RECORDING MEDIUM

TECHNICAL FIELD

The present invention relates to a program production method, a program production apparatus, and a recording medium, and particularly, to a program production method or the like to be used by the program production apparatus for production of a program.

BACKGROUND ART

As disclosed in Patent documents 1, 2, and 3 or the like, for example, the present applicant has researched and developed an information processing apparatus that automatically generates a program using information input by a creator.

CITATION LIST

Patent Literature

[Patent document 1]
  Japanese Patent No. 4,725,936
[Patent document 2]
  Japanese Patent No. 4,725,918
[Patent document 3]
  Japanese Patent Application No. 2019-157209

SUMMARY OF INVENTION

Technical Problem

However, at present, in a case of providing live broadcasting, live streaming, or the like, this requires the participation of many people and a great amount of manual operations. Furthermore, it is difficult for such a program production apparatus researched and developed by the present applicant to flexibly handle a situation that changes with time such as live broadcasting, live streaming, or the like.

In order to solve such a problem, it is a purpose of the present invention to propose a program production method or the like that is suitable for producing a program according to a change in situation.

Solution of Problem

A first aspect of the present invention relates to a program production method employed in a program production apparatus for generating a program. The program production apparatus includes: a basic script storage unit configured to store a basic script; a program production unit configured to generate program data that specifies the program; a dynamic data processing unit configured to generate dynamic data; and a dynamic data storage unit configured to store the dynamic data. The program production method includes: first program data generation in which the program production unit generates first program data using at least a part of the basic script without using the dynamic data; and second program data generation in which the program production unit generates second program data using at least a part of the basic script and the dynamic data. Before starting processing for generating the second program data, the dynamic data processing unit generates the dynamic data. In the second program data generation, the program production unit generates the second program data using at least a part of the basic script and the dynamic data generated by the dynamic data processing unit.

A second aspect of the present invention relates to the program production method according to the first aspect. The basic script includes a first basic script portion and a second basic script portion. In the first program data generation, the program production unit generates the first program data using the first basic script portion. In the second program data generation, the program production unit generates the second program data using the second basic script portion and the dynamic data.

A third aspect of the present invention relates to the program production method according to the second aspect. The basic script includes a first basic script portion, a second basic script portion, and a third basic script portion. As a step following the second program data generation, the program production method includes third program data generation in which the program production unit generates third program data using the third basic script portion without using the dynamic data. The basic script defines a third program data playback start time point at which playback of a program specified by the third program data is to be started. The dynamic data specifies at least a second program data playback start time point at which a program specified by the second program data is to be started. In the second program data generation, the program production unit changes a playback time according to the second program data playback start time point and the third program data playback start time point so as to generate the second program data.

A fourth aspect of the present invention relates to the program production method according to the first aspect. The dynamic data includes first dynamic data and second dynamic data that differs from the first dynamic data. In the second program data generation, the program production unit generates first local program data using at least a part of the basic script and the first dynamic data, and generates second local program data using at least a part of the basic script and the second dynamic data.

A fifth aspect of the present invention relates to the program production method according to the fourth aspect. The program production apparatus includes: a program playback unit configured to transmit the program data to a playback apparatus; and an index data processing unit configured to generate first index data that specifies a feature of the first local program data and second index data that specifies a feature of the second local program data. The playback apparatus includes: an environment data processing unit configured to collect environment data; and a program selection unit. The program selection unit makes a comparison between the first index data, the second index data, and the environment data, so as to select one from among the first local program data and the second local program data. The program playback unit transmits the program data selected by the program selection unit to the playback apparatus.

A sixth aspect of the present invention relates to the program production method according to the first aspect. The program production unit generates multiple items of the second program data. The program production unit generates a different kind of the second program data according to the file format of the second program data to be generated.

A seventh aspect of the present invention relates to the program production method according to the sixth aspect. The program production unit generates the program using a character. In the second program data generation, the program production unit adjusts a movement of the character and/or adjusts at least one from among a line to be spoken by the character, BGM, and sound effects, according to the file format of the second program data, so as to generate the second program data.

An eight aspect of the present invention relates to the program production method according to the seventh aspect. When a creator makes an instruction not to make adjustment according to the file format, the program production unit generates the second program data using a performance that is common to multiple file formats. Conversely, when the creator makes an instruction to make adjustment according to the file format, the program production unit adjusts a movement of the character and/or adjusts at least one from among a line to be spoken by the character, BGM, and sound effects, according to each file format, so as to generate the second program data.

A ninth aspect of the present invention relates to the program production method according to the eighth aspect. When the creator makes an instruction not to make an adjustment according to the file format, the program production unit generates basic second moving image data in a file format that relates to an operating system of the computer that provides the program production apparatus using the performance, and converts the basic second moving image data so as to generate the second moving image data in another file format.

A tenth aspect of the present invention relates to a program production apparatus configured to generate a program. The program production apparatus includes: a basic script storage unit configured to store a basic script; a program production unit configured to generate program data that specifies the program; a dynamic data processing unit configured to generate dynamic data; and a dynamic data storage unit configured to store the dynamic data. The program production unit generates first program data using at least a part of the basic script without using the dynamic data. The program production unit generates second program data using at least a part of the basic script and the dynamic data. The dynamic data processing unit generates the dynamic data in a period of time from a time point at which the program production unit starts processing for generating the first program data to a time point at which the program production unit starts processing for generating the second program data. The program production unit generates the second program data using at least a part of the basic script and the dynamic data generated by the dynamic data processing unit.

An eleventh aspect of the present invention relates to the program production apparatus according to the tenth aspect. The basic script includes a first basic script portion and a second basic script portion. The program production unit generates the first program data using the first basic script portion. The program production unit generates the second program data using the second basic script portion and the dynamic data.

A twelfth aspect of the present invention relates to the program production apparatus according to the eleventh aspect. The basic script includes a first basic script portion, a second basic script portion, and a third basic script portion. After the program production unit generates the second program data, the program production unit generates third program data using the third basic script portion without using the dynamic data. The basic script defines a third program data playback start time point at which playback of a program specified by the third program data is to be started. The dynamic data specifies at least a second program data playback start time point at which a program specified by the second program data is to be started. In the second program data generation, the program production unit changes a playback time according to the second program data playback start time point and the third program data playback start time point so as to generate the second program data.

A thirteenth aspect of the present invention relates to the program production apparatus according to the tenth aspect. The dynamic data includes first dynamic data and second dynamic data that differs from the first dynamic data. The program production unit generates first local program data using at least a part of the basic script and the first dynamic data, and generates second local program data using at least a part of the basic script and the second dynamic data.

A fourteenth aspect of the present invention relates to the program production apparatus according to the thirteenth aspect. The program production apparatus includes: a program playback unit configured to transmit the program data to a playback apparatus; and an index data processing unit configured to generate first index data that specifies a feature of the first local program data and second index data that specifies a feature of the second local program data. The playback apparatus includes: an environment data processing unit configured to collect environment data; and a program selection unit. The program selection unit makes a comparison between the first index data, the second index data, and the environment data, so as to select one from among the first local program data and the second local program data. The program playback unit transmits the program data selected by the program selection unit to the playback apparatus.

A fifteen aspect of the present invention relates to the program production apparatus according to the fourteenth aspect. The the program production unit generates multiple items of the second program data. The program production unit generates a different kind of the second program data according to the file format of the second program data to be generated.

A sixteen aspect of the present invention relates to the program production apparatus according to the fifteenth aspect. The program production unit generates the program using a character. The program production unit adjusts a movement of the character and/or adjusts at least one from among a line to be spoken by the character, BGM, and sound effects, according to the file format of the second program data, so as to generate the second program data.

A seventeen aspect of the present invention relates to the program production apparatus according to the sixteenth aspect. When a creator makes an instruction not to make adjustment according to the file format, the program production unit generates the second program data using a performance that is common to multiple file formats. Conversely, when the creator makes an instruction to make adjustment according to the file format, the program production unit adjusts a movement of the character and/or adjusts at least one from among a line to be spoken by the character, BGM, and sound effects, according to each file format, so as to generate the second program data.

An eighteenth aspect of the present invention relates to the program production apparatus according to the seventeenth aspect. When the creator makes an instruction not to make an adjustment according to the file format, the program production unit generates basic second moving image data in a file format that relates to an operating system of a computer that provides the program production apparatus using the performance, and converts the basic second moving image data so as to generate the second moving image data in another file format.

A nineteenth aspect of the present invention relates to a computer-readable recording medium that records a program for instructing a computer to function as the program production apparatus according to any one of the tenth aspect to the eighteenth aspect.

It should be noted that the present invention may be regarded as a program production apparatus including a program production unit configured to generate program data, wherein the program production unit generates a different kind of the program data according to the file format of the program data to be generated. Also, the present invention may be regarded as a program production method or the like employed in the program production apparatus.

Advantageous Effects of Invention

With each aspect of the present invention, in the first stage, this allows an overall structure of the program to be generated using a basic script determined beforehand. Furthermore, this arrangement is then able to gradually generate the program while adjusting the basic script based on the dynamic data. With this, the dynamic data allows a change in situation to be handled in a flexile manner. For example, in a case of providing live broadcasting, first, such an arrangement provides the program with an overall unity according to the basic script. Subsequently, for example, when there is no time to spare, such an arrangement becomes able to gradually handle such a situation. Also, in a case of providing a notice of disaster information, for example, first, such an arrangement provides information of the fact that an event has occurred, such as "An earthquake has occurred". Subsequently, such an arrangement becomes able to gradually provide notice of specific information that corresponds to each viewer and listener using information received from each municipality.

BRIEF DESCRIPTION OF DRAWINGS

FIG. 4A is a diagram showing an example of a basic script of the program production system 101 shown in FIG. 3, FIGS. 4B and 4C are flowcharts each showing an example of an operation, and FIG. 4D is a diagram showing an example of the relation between program data to be generated.

DESCRIPTION OF EMBODIMENTS

Description will be made below with reference to the drawings regarding an example of the present invention. It should be noted that the present invention is not restricted to such an example.

EXAMPLES

Figure 1:
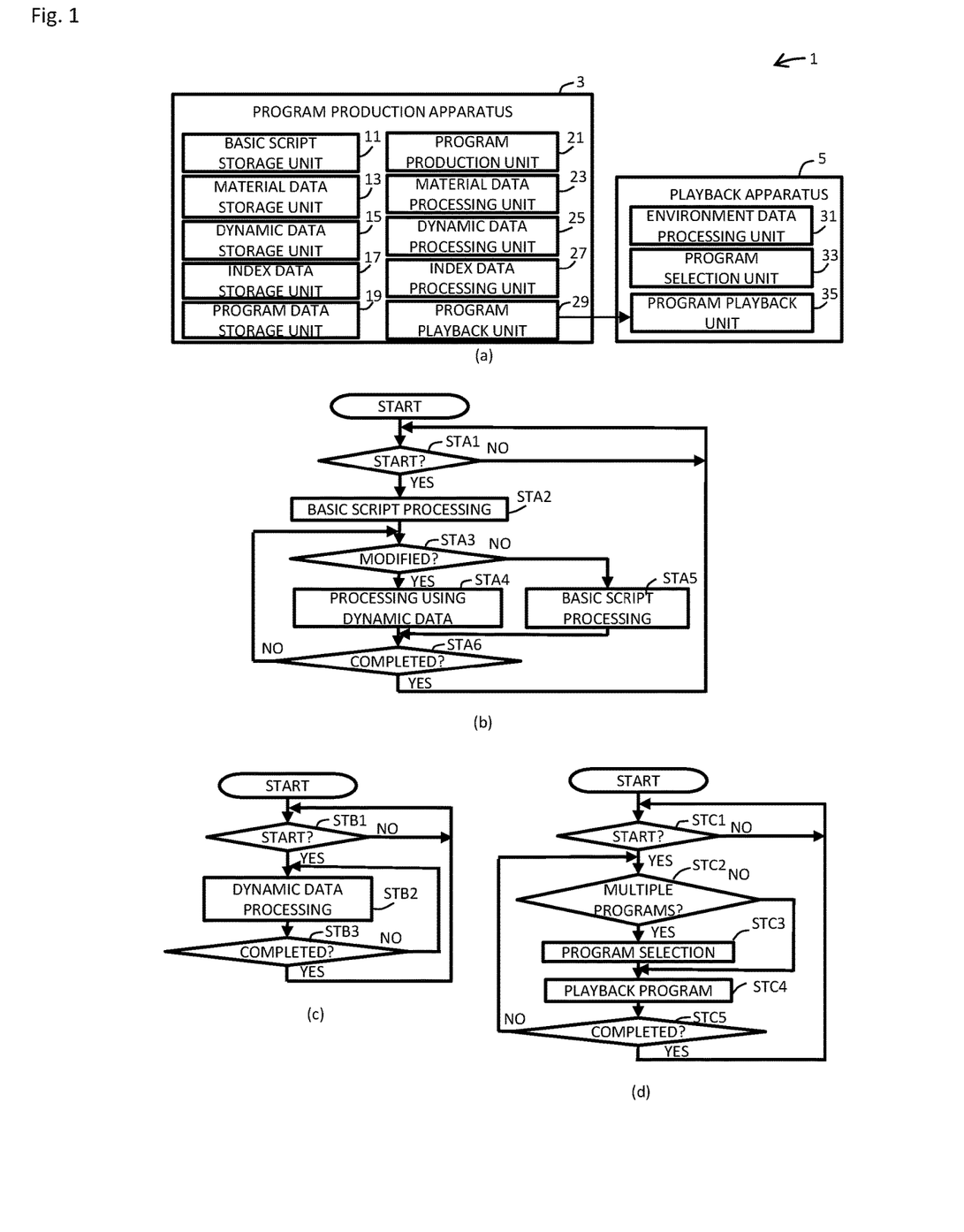
FIG. 1A is a block diagram showing an example configuration of a program production system 1 according to an embodiment of the present invention.
FIGS. 1B, 1C, and 1D are flowcharts each showing an example of the operation thereof.

FIG. 1A is a block diagram showing an example configuration of a program production system 1 according to an embodiment of the present invention, and FIGS. 1B through 1D are flowcharts each showing an example of the operation thereof.

Referring to FIG. 1A, the program production system 1 includes a program production apparatus 3 (an example of a "program production apparatus" in the appended claims) and a playback apparatus 5 (an example of a "playback apparatus" in the appended claims). The program production apparatus 3 and the playback apparatus 5 are able to communicate with each other via the Internet, for example.

The program production apparatus 3 includes a basic script storage unit 11 (an example of a "basic script storage unit" in the appended claims), a material data storage unit 13, a dynamic data storage unit 15 (an example of a "dynamic data storage unit" in the appended claims), an index data storage unit 17, a program data storage unit 19, a program production unit 21 (an example of a "program production unit" in the appended claims), a material data processing unit 23, a dynamic data processing unit 25 (an example of a "dynamic data processing unit" in the appended claims), an index data processing unit 27 (an example of an "index data processing unit" in the appended claims), and a program playback unit 29 (an example of a "program playback unit" in the appended claims).

The basic script storage unit 11 stores a basic script.

The material data storage unit 13 stores data to be used for generating a program. Examples of such material data include: sound data or video data recorded beforehand; sound data for generating sound effects, BGM, or the like; and sound data and video data collected at the same time as the generation of a program in a case of providing live broadcasting, live streaming, or the like. The material data processing unit 23 manages material data. For example, in a case of providing live broadcasting, live streaming, or the like, the material data processing unit 23 collects the sound data recorded by a recording device at the same time as the generation of the program, and instructs the material data storage unit 13 to store the sound data thus acquired.

In a period from a time point at which the program production unit 21 starts processing for generating a program to a time point at which it starts processing for generating the next program, the dynamic data processing unit 25 collects information required for generating the next program, so as to generate dynamic data. Here, the dynamic data may be generated based on newly collected information, for example. Also, in order to generate the dynamic data, the dynamic data generated based on the previously collected information may be updated based on the newly collected information. The dynamic data storage unit 15 stores the dynamic data.

The program production unit 21 generates the program by executing necessary processing such as emotion analysis or the like using the basic script, the material data, and the dynamic data, and generates the program data for specifying the program thus generated. The program data storage unit stores the program data generated by the program production unit 21.

When the program production unit 21 generates multiple items of program data, the index data processing unit 27 generates index data that indicates the features of each item of program data. The index data storage unit 17 stores the index data.

The program playback unit 29 transmits the program data to the playback apparatus 5.

The playback apparatus 5 includes an environment data processing unit 31 (an example of an "environment data processing unit" in the appended claims), a program selection unit 33 (an example of a "program selection unit" in the appended claims), and a program playback unit 35.

The environment data processing unit 31 generates environment data for specifying an environment of the playback apparatus 5. For example, the environment data is used to specify the district in which the playback apparatus 5 is located using a GPS or the like, to specify topics that attract a high degree of interest of the user of the playback apparatus 5 based on a conversation of the user of the playback apparatus 5, as well as instructions specified by the user.

When there are multiple items of the program data, the program selection unit 33 selects the program data to be played back using the index data and the environment data.

The program playback unit 35 receives the program data from the program playback unit 29, and plays back the program specified by the program data. For example, in a case in which the playback apparatus 5 is configured as a device that plays back sound (e.g., an artificial intelligence (AI) speaker or the like), the sound specified by the program data is played back. For example, in a case in which the playback apparatus 5 is configured as a device that plays back video and sound (e.g., a TV or the like), the program playback apparatus 5 plays back the sound and video specified by the program data.

Description will be made with reference to FIG. 1A regarding an example of the processing for generating the program data executed by the program production unit 21. The program production unit 21 stands by before the generation of the program (Step STA1).

When a program is to be generated (when judgment of "YES" has been made in Step STA1), the program production unit 21 generates a program using a part of or all of the basic script without using the dynamic data, and generates program data for specifying the program thus generated (Step STA2). In this stage, the dynamic data processing unit 25 generates the dynamic data in parallel in step STB2. The program data storage unit 19 stores the program data thus generated.

The program producing unit 21 judges whether or not the dynamic data is to be used (Step STA3).

When the dynamic data is to be used, a program is generated using a part of or all of the basic script and the dynamic data, and the program data is generated for specifying the program thus generated (Step STA4). The program data storage unit 19 stores the program data thus generated. When multiple items of program data have been generated, the index data processing unit generates index data that indicates the features of each program thus generated. The index data storage unit 17 stores the index data. Subsequently, the flow proceeds to Step STA6.

When the dynamic data is not to be used, a program is generated using a part of or all of the basic script without the dynamic data, and the program data is generated for specifying the program thus generated (Step STA5). The program data storage unit 19 stores the program data thus generated. Subsequently, the flow proceeds to Step STA6.

In Step STA6, judgment is made with regard to whether or not the processing for generating the program is to be completed. When the processing is to be completed, the flow returns to Step STA'. Otherwise, the flow returns to Step STA3.

Description will be made with reference to FIG. 1C regarding an example of the processing for generating the dynamic data executed by the dynamic data processing unit 25. The dynamic data processing unit 25 stands by before the processing for generating the program is started (Step STB1). When the processing for generating the program is started ("YES" in Step STB1), the dynamic data processing unit 25 generates the dynamic data (Step STB2). The dynamic data storage unit 15 stores the dynamic data thus generated. The dynamic data processing unit 25 judges whether or not the processing for generating the program has been completed (Step STB3). When judgement has been made that the processing has been completed, the flow returns to Step STB1. Otherwise, the flow returns to Step STB2.

Description will be made with reference to FIG. 1B regarding an example of the operation of the playback apparatus 5. The environment data processing unit 31 continuously manages environment data. The program playback unit 35 stands by before the processing for playing back the program is started (Step STC1). When the processing for playing back the program is to be started ("YES" in Step STC1), the program playback unit 35 judges whether or not the number of items of program data is plural (Step STC2). When judgment has been made that a single item of program data has been generated, the flow proceeds to Step STC4. When the number of items of program data is plural, the program selection unit 33 selects the program data to be played back from the multiple items of program data thus generated using the environment data and the index data (Step STC3), following which the flow proceeds to Step STC4. In Step STC4, the program playback unit 35 receives the program data to be played back from the program playback unit 29, and plays back the program. The program playback unit 35 judges whether or not the processing for playing back the program has been completed (Step STC5). When the processing has been completed, the flow returns to Step STC1. Otherwise, the flow returns to Step STC2.

Description will be made with reference to FIG. 2 regarding an example in which the basic script is divided into five basic script portions, and generated program data is sequentially played back by the playback apparatus while sequentially using the basic script portions to generate the program data.

FIG. 2A is a block diagram showing an example configuration of a program production system 51 according to an embodiment of the present invention. FIG. 2B is a diagram showing an example of the basic script. FIG. 2C is a flowchart showing an example of the operation thereof.

Referring to FIG. 2A, the program production system 51 includes a material server 53, a program production apparatus 55 (an example of a "program production apparatus" in the appended claims), an image capture apparatus 57, and a display apparatus 59 (an example of a "playback apparatus" in the appended claims). Communication between the image capture apparatus 57 and the material server 53, communication between the material server 53 and the program production apparatus 55, and communication between the program production apparatus 55 and the display apparatus 59 are provided using the Internet, for example.

The image capture apparatus 57 captures images so as to collect captured image data (including video data and sound data), and transmits the captured image data to the material server 53.

The material server 53 includes a material data storage unit 61 and a captured image data receiving unit 63. The captured image data receiving unit 63 receives the captured image data transmitted by the image capture apparatus 57. The material data storage unit 61 stores the captured image data. Description will be made assuming that the image capturing is performed twice such that first captured image data 65 is obtained in the first image capturing and second captured image data 67 is obtained in the next image capturing.

The program production apparatus 55 includes a program production unit 71 (an example of a "program production unit" in the appended claims), a material data processing unit 73, a dynamic data processing unit 75 (an example of a "dynamic data processing unit" in the appended claims), an input unit 77, a program playback unit 79 (an example of a "program playback unit" in the appended claims), a basic script storage unit 81 (an example of a "basic script storage unit" in the appended claims), a dynamic data storage unit 82 (an example of a "dynamic data storage unit" in the appended claims), and a program data storage unit 83.

Figure 2:
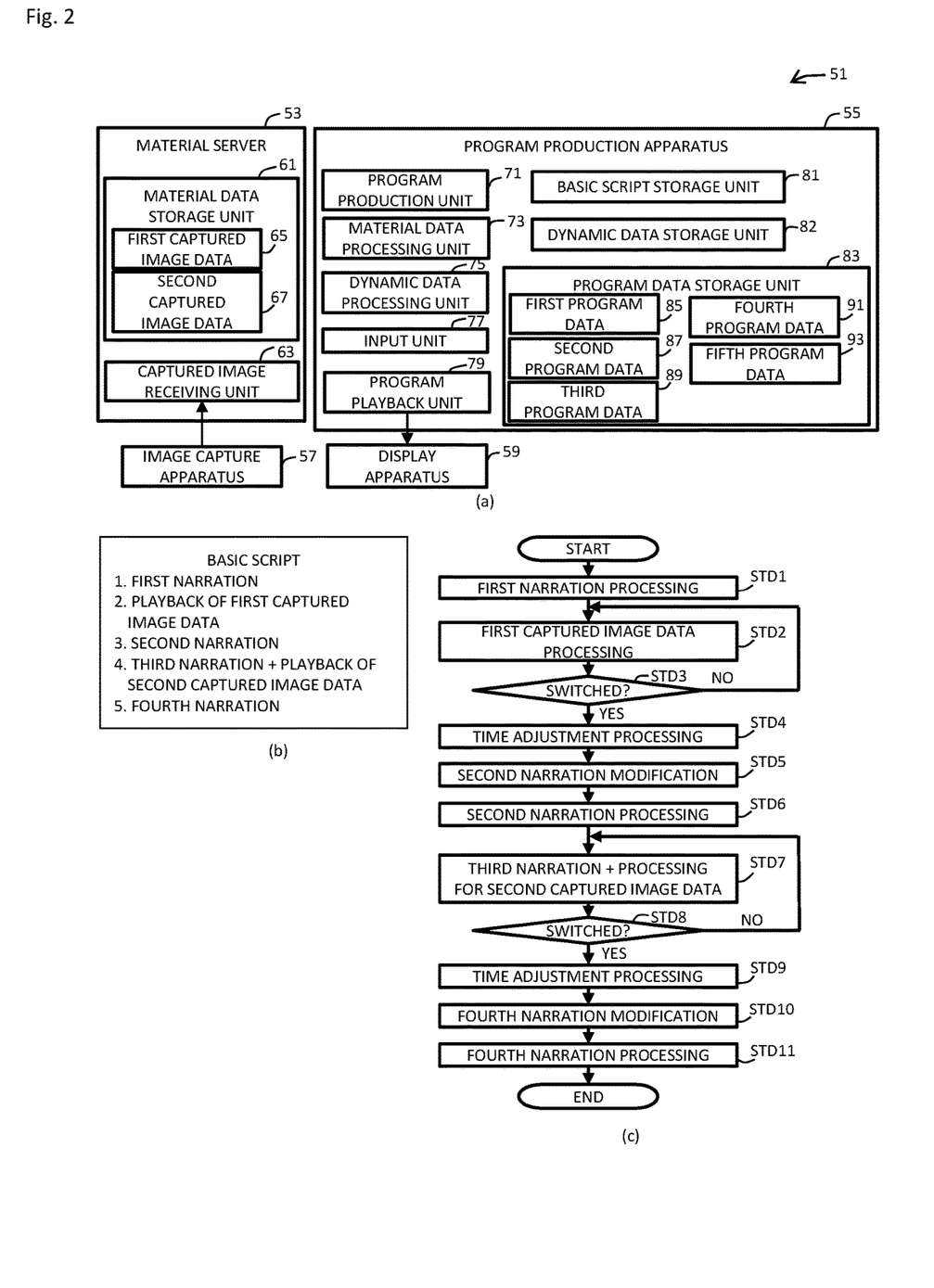
FIG. 2A is a block diagram showing an example configuration of a program production system 51 according to an embodiment of the present invention.
FIG. 2B is a diagram showing an example of a basic script thereof.
FIG. 2C is a flowchart showing an example of the operation thereof.

In the example shown in FIG. 2, a single item of program data is generated for each basic script portion. Accordingly, the index data is not generated. The program production unit 71 sequentially generates the program data corresponding to each of the five basic script portions. The five items of program data thus generated will be referred to as "first program data 85", "second program data 87", "third program data 89", "fourth program data 91", and "fifth program data 93", in this order. The display apparatus 59 sequentially plays back the programs specified by the program data thus generated.

The program production unit 71, the material data processing unit 73, the dynamic data processing unit 75, the program playback unit 79, the basic script storage unit 81, and the dynamic data storage unit 82 are substantially the same as the program production unit 21, the material data processing unit 23, the dynamic data processing unit 25, the program playback unit 29, the basic script storage unit 11, and the dynamic data storage unit 15 shown in FIG. 1A, respectively. The user of the program production apparatus 55 is able to operate the input unit 77 (e.g., mouse, keyboard, touch panel, etc.) so as to input an instruction to the program production apparatus 55.

Description will be made with reference to FIG. 2B regarding the basic script. The basic script is divided into five basic script portions.

As a first basic script portion, a first narration is provided. The first narration defines words for introducing the viewers to the program. The program production unit 71 generates the first program data 85 that specifies a program in which a character is displayed such that it speaks the words defined in the first narration as its lines while the character is made to move, for example.

As the next basic script portion, the playback of the first captured image data 65 is provided. Description will be made in this example assuming that the program is generated and played back at substantially the same time as the image capturing, as with live broadcasting, live streaming, or the like. In the playback of the first captured image data 65, the image capture apparatus 57 transmits the first captured image data to the material server 53 while capturing an image so as to obtain the first captured image data. The material data processing unit 73 obtains the first captured image data 65 in parallel with the image capturing by the image capture apparatus 57. The program production unit 71 generates the second program data 87 so as to specify a program in which the first captured image data 65 is to be played back. The processing for the second program data 87 is continued until the user of the program production apparatus 55 inputs a switching instruction via the input unit 77. Upon receiving the switching instruction, the processing of the second program data 87 transits to the next processing, i.e., the processing of the third program data 89.

As the next basic script portion, a second narration is provided. The second narration is provided in order to connect the interest of the viewers from the first captured image data to the second captured image data. The program production unit 71 generates the third program data 89 for specifying a program in which a character is displayed such that it speaks lines while the character is made to move, for example. Here, description will be made assuming that the basic script defines a time point at which the processing using the second narration is to end (i.e., a time point at which a program is to be started using the next narration, i.e., the third narration, and the second captured image data).

As the next basic script portion, processing using the third narration and the second captured image data is provided. The third narration defines words for explaining the second captured image data. The program production unit 71 generates the fourth program data 91 for specifying a program in which the second image data 67 is played back at substantially the same time as the image capturing by the image capture apparatus 57 as with the processing using the first captured image data 65. Furthermore, the program production unit 71 uses the fourth program data 91 to specify a program in which the character is displayed such that it speaks lines defined in the third narration while the character is made to move at the same time as the capturing of the second captured image data 67, for example. The processing of the fourth program data 91 is continued until the user of the program production apparatus 55 supplies a switching instruction via the input unit 77. Upon receiving the switching instruction, the processing transits to the next processing of the fifth program data 93.

As the next basic script portion, the processing using the fourth narration is provided. The fourth narration is provided in order to summarize the program. The program production unit 71 generates the fifth program data 93 for specifying a program in which the character is displayed such that it speaks lines while the character is made to move, for example. Here, description will be made assuming that the basic script defines a time point at which the processing using the fourth narration is to end.

Description will be made with reference to FIG. 2C regarding an example of the operation of the program production system 51.

The program production unit 71 generates the first program data 85 using the first narration of the basic script (Step STD1).

The program production unit 71 uses the "playback of the first captured image data" of the basic script to generate the second program data 87, so as to play back the first captured image data 65 in parallel with the image capturing by the image capture apparatus 57 (Step STD2). The program production unit 71 judges whether or not the user of the program production apparatus 55 operates the input unit 77 so as to input a switching instruction (Step STD3). When no switching instruction is input, the processing in Step STD2 is continued. Upon receiving the switching instruction, the flow proceeds to Step STD4.

In Step STD4, the dynamic data processing unit 75 calculates, as the dynamic data, the time point at which the program using the second narration is to be started (Step STD4). The program production unit 71 adjusts the expression of the words of the second narration or the speed at which the character speaks its lines based on the time point at which the program using the second narration is to be started, which is obtained from the dynamic data, and the time point at which the playback of the program using the second narration is to be completed, which is defined in the basic script (i.e., the time point at which the program is to be started using the next narration, i.e., the third narration and the second captured image data), such that the program using the second narration is interposed between them (Step STD5). The program production unit 71 generates the third program data 89 using the second narration (Step STD6).

The program production unit 71 uses the "processing using the third narration and playback of the second captured image data" to generate the fourth program data 91, and plays back the second captured image data 67 in parallel with image capturing by the image capture apparatus 57, and plays back the character or the like using the third narration (Step STD7). The program production unit 71 judges whether or not the user of the program production apparatus 55 operates the input unit 77 so as to input a switching instruction (Step STD8). When no switching instruction is input, the processing in Step STD7 is continued. Upon receiving the switching instruction, the flow proceeds to Step STD9.

In Step STD9, the dynamic data processing unit 75 calculates, as the dynamic data, the time point at which the program using the fourth narration is to be started (Step STD9). The program production unit 71 adjusts the expression of the words of the fourth narration or the speed at which the character speaks its lines based on the time point at which the program using the fourth narration is to be started, which is obtained from the dynamic data, and the time point at which the playback of the program using the fourth narration is to be completed, which is defined in the basic script such that the program using the fourth narration is interposed between them (Step STD10). The program production unit 71 generates the fifth program data 93 using the fourth narration (Step STD11).

With the program production system 51 shown in FIG. 2, this allows the user to provide live broadcasting, live streaming, or the like, by inputting a playback switching instruction between the first captured image data 65 and the second captured image data 67 via the input unit 77.

Description will be made with reference to FIGS. 3 and 4 regarding a case of automatically generating a program for warning of an earthquake.

When disaster information is provided, typically, there is information of common interest to many viewers and listeners. For example, where a disaster has occurred and what kind of disaster it is are matters of common interest. In contrast, there is a difference among viewers and listeners in their level of interest regarding information about a disaster that has not occurred in their local area. For example, in Japan, typhoons travel from west to east. Accordingly, when a typhoon approaches the Kyushu region, which is in the west, for typical viewers and listeners residing in the Kanto region, which is in the east, they have an interest in information regarding whether or not the typhoon will approach the Kanto region rather than information regarding whether or not a disaster has occurred in the Kanto region due to the typhoon. Also, it is anticipated that viewers and listeners will be able to predict damage that will occur when the typhoon approaches the Kanto region based on damage that is occurring in the Kyushu region. Such information is of common interest to many viewers and listeners. Empirically, the ratio of information of common interest is estimated to be on the order of 70%. In contrast, in a case in which a person has an acquaintance in the Kyushu region, it is anticipated that the person would be interested in whether or not a disaster has occurred in an area in which the acquaintance resides. Description will be made regarding an example in which a topic of individual interest is supported based on the dynamic data while transmitting information of common interest based on the basic script.

Description will be made in this example assuming that the playback apparatus is configured as a speaker, and a program using sound is automatically generated. FIG. 3 is a block diagram showing an example configuration of a program production system 101 according to an embodiment of the present invention. FIG. 4A is a diagram showing an example of the basic script. FIGS. 4B and 4C are flowcharts each showing an example of the operation thereof. FIG. 4D is a diagram showing an example of the relation between the program data to be generated.

Figure 3:
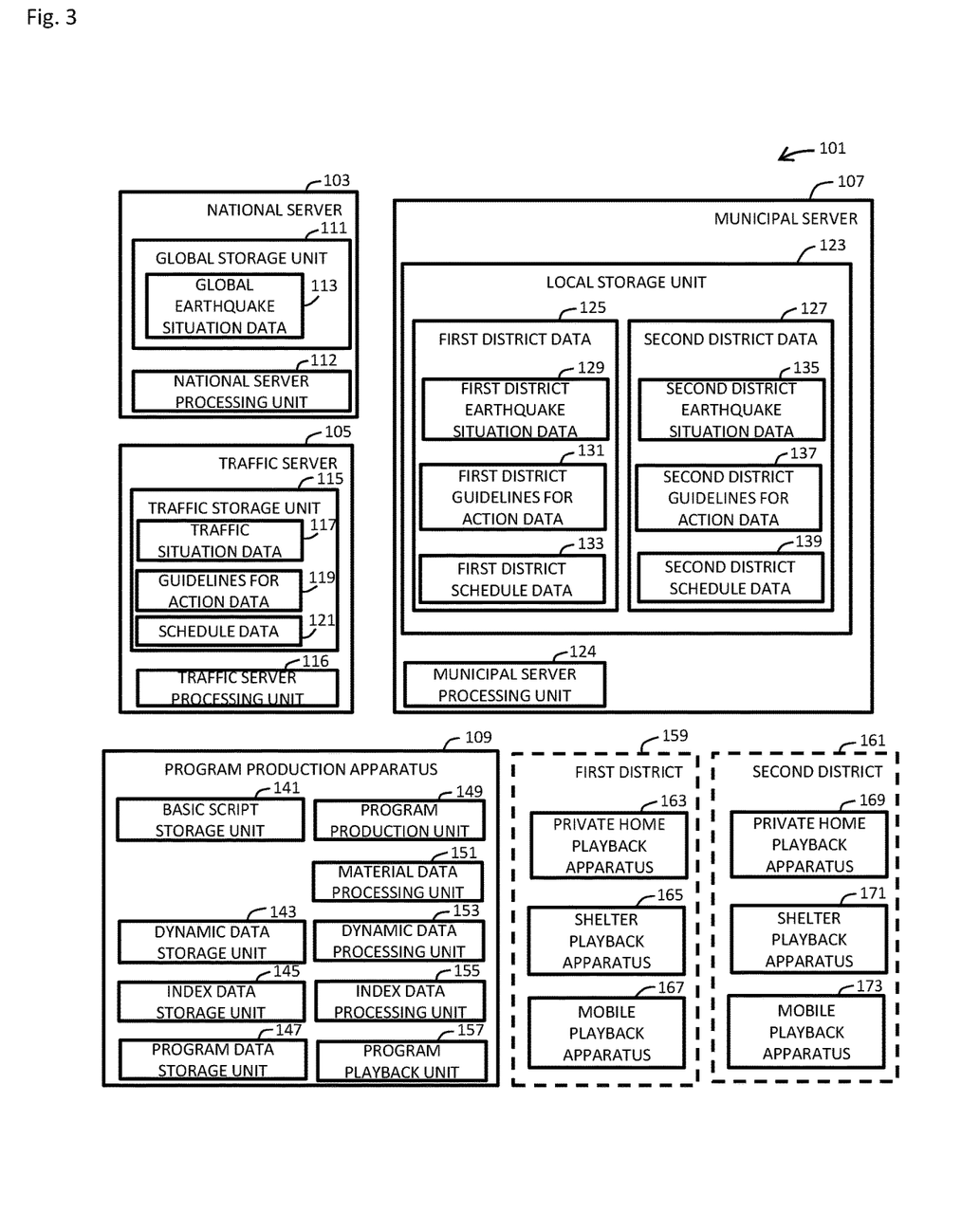
FIG. 3 is a block diagram showing an example configuration of a program production system 101 according to an embodiment of the present invention.
Figure 4:
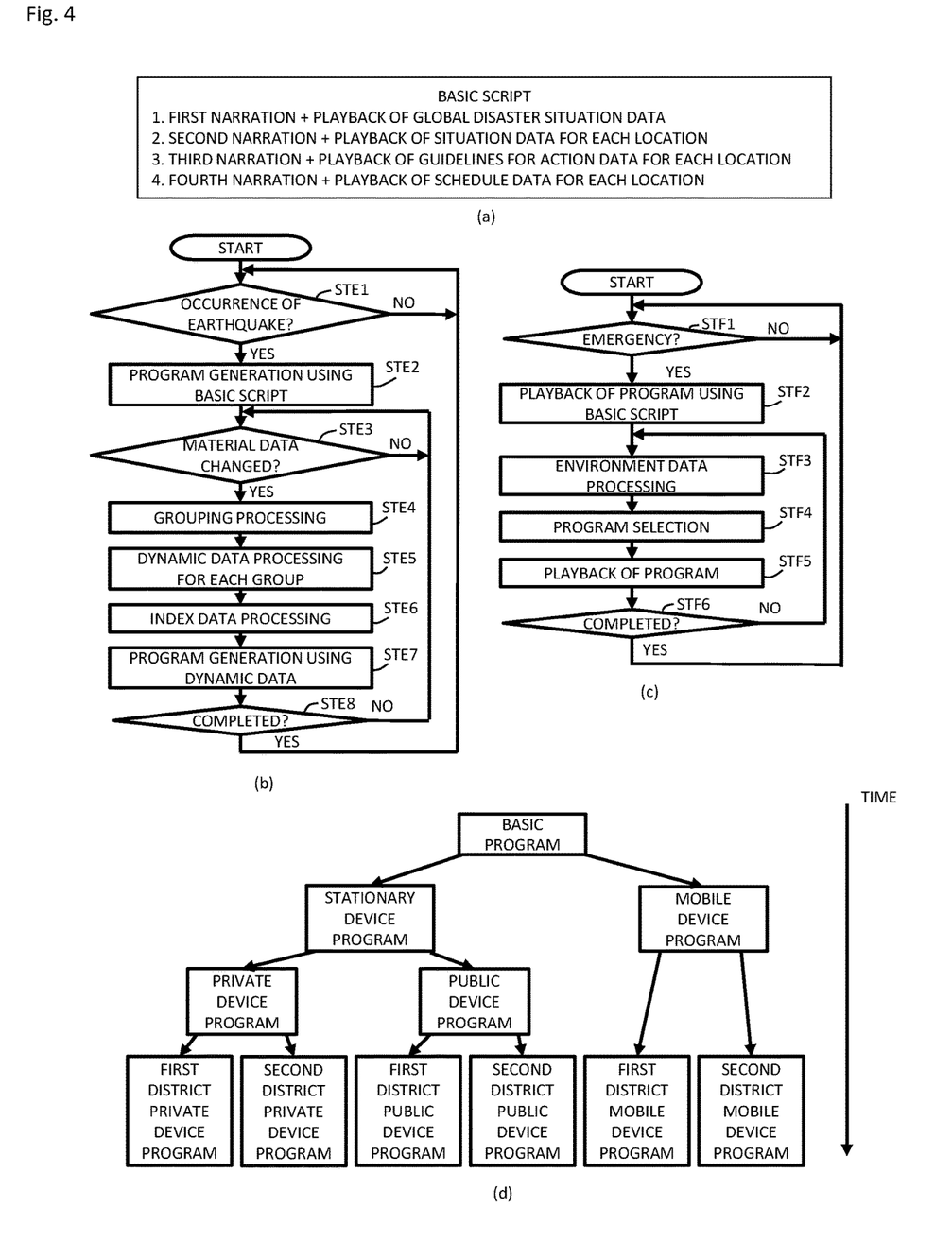

Referring to FIG. 3, the program production system 101 includes a national server 103, a traffic server 105, a municipal server 107, and a program production apparatus 109 (an example of a "program production apparatus" in the appended claims). Furthermore, the program production system 101 includes a private home playback apparatus 163, a shelter playback apparatus 165, and a mobile playback apparatus 167, which are in a first district 159, and a private home playback apparatus 169, a shelter playback apparatus 171, and a mobile playback apparatus 173, which are in a second district 161. In this example, each of the private home production apparatus 163, the shelter playback apparatus 165, the mobile playback apparatus 167, the private home production apparatus 169, the shelter playback apparatus 171, and the mobile playback apparatus 173 will also be referred to as a "playback apparatus". The program production system 101 supports communication between the national server 103, the traffic server 105, and the municipal server 107 and the program production apparatus 109, as well as communication between the program production apparatus 109 and the playback apparatuses, via the Internet.

The national server 103 is a server managed by a nation, for example. The national server 103 includes a global storage unit 111 and a national server processing unit 112. The global storage unit 111 stores global earthquake situation data 113. The global earthquake situation data 113 specifies the epicenter, the seismic intensity, etc., for example. The national server processing unit 112 manages the global earthquake situation data 113.

The traffic server 105 is a server managed by a road management organization, for example. The traffic server 105 includes a traffic storage unit 115 and a traffic server processing unit 116. The traffic storage unit 115 stores traffic situation data 117, guidelines for action data 119, and schedule data 121. The traffic situation data 117 specifies information with respect to the road traffic situation in each area. The guidelines for action data 119 specifies guidelines with respect to action to be taken by the listeners of the program according to the road traffic situation in each area. The schedule data 121 specifies the plan for the future. Specifically, the schedule data 121 specifies the prospects for alleviation of traffic congestion, a timing of the next update of each data, etc. The traffic server processing unit 116 manages data stored in the traffic storage unit 115.

The municipal server 107 is a server managed by a local government, for example. The municipal server 107 includes a local storage unit 123 and a municipal server processing unit 124. The local storage unit 123 stores first district data 125 and second district data 127. The municipal server processing unit 124 manages the data stored in the local storage unit 123.

The first district data 125 includes first district earthquake situation data 129, first district guidelines for action data 131, and first district schedule data 133. The first district earthquake situation data 129 specifies information with respect to the earthquake situation in the first district. The first district guidelines for action data 131 specifies the guidelines for action to be taken by the listeners in the first district according to the earthquake situation in the first district. The first district schedule data 133 specifies the plan for the future. Specifically, the first district schedule data 133 specifies the outlook for rescue, a timing of the next update of each data, etc., for example.

The second district data 127 includes second district earthquake situation data 135, second district guidelines for action data 137, and second district schedule data 139. The second district earthquake situation data 135 specifies information with respect to the earthquake situation in the second district. The second district guidelines for action data 137 specifies the guidelines for action to be taken by the listeners in the second district according to the earthquake situation in the second district. The second district schedule data 139 specifies the plan for the future. Specifically, the second district schedule data 139 specifies the outlook for rescue, a timing of the next update of each data, etc., for example.

Typically, immediately after the occurrence of an earthquake, the national server 103 is able to provide enhanced information. As time passes after the occurrence of the earthquake, the information provided by the municipal server 107 becomes enhanced.

The program production apparatus 109 includes a basic script storage unit 141 (an example of a "basic script storage unit" in the appended claims), a dynamic data storage unit 143 (an example of a "dynamic data storage unit" in the appended claims), an index data storage unit 145, a program data storage unit 147, a program production unit 149 (an example of a "program production unit" in the appended claims), a material data processing unit 151, a dynamic data processing unit 153 (an example of a "dynamic data processing unit" in the appended claims), an index data processing unit 155 (an example of an "index data processing unit" in the appended claims), and a program playback unit 157 (an example of a "program playback unit" in the appended claims).

The basic script storage unit 141, the dynamic data storage unit 143, the index data storage unit 145, the program data storage unit 147, the program production unit 149, the material data processing unit 151, the dynamic data processing unit 153, the index data processing unit 155, and the program playback unit 157 are substantially the same as the basic script storage unit 11, the dynamic data storage unit 15, the index data storage unit 17, the program data storage unit 19, the program production unit 21, the material data processing unit 23, the dynamic data processing unit 25, the index data processing unit 27, and the program playback unit 29 shown in FIG. 1A.

In the first district 159, the private home playback apparatus 163 is configured to play back a program using a speaker installed in a private home. The shelter playback apparatus 165 is configured to play back a program using a speaker installed in a shelter. The mobile playback apparatus 167 is configured as a mobile device that is capable of playing back a program while moving, examples of which include an in-vehicle speaker, a smartphone, etc.

In the second district 161, the private home playback apparatus 169 and the shelter playback apparatus 171 are configured to play back a program installed in a private home and in a shelter, respectively. The mobile playback apparatus 173 is configured as a mobile device that is capable of playing back a program while moving, for example.

Description will be made with reference to FIG. 4A regarding the basic script. The program production unit 149 repeatedly uses the basic script to generate the program data. The basic script is divided into four basic script portions.

As the first basic script portion, an explanation of the global earthquake situation data 113 is provided. As the next basic script portion, an explanation of the situation data (the traffic situation data 117, the first district earthquake situation data 129, and the second district earthquake situation data 135) is provided. As the next basic script portion, an explanation of the guidelines for action data (the guidelines for action data 119, the first district guidelines for action data 131, and the second district guidelines for action data 137) is provided. As the next basic script portion, an explanation of the schedule data (the schedule data 121, the first district schedule data 133, and the second district schedule data 139) is provided.

Description will be made with reference to FIGS. 4A and 4B regarding an example of the operation of the program production system 101.

Referring to FIG. 4B, in a normal state, normal programs are broadcasted or streamed. The program production unit 149 stands by until the national server 103 transmits a notice of the occurrence of an earthquake (Step STEL). For example, upon receiving a notice of the occurrence of an earthquake from the national server 103 ("YES" in Step STEL), the program production unit 149 notifies the playback apparatuses of an emergency program to be broadcasted, and generates a program using the material data according to the basic script (Step STE2). It should be noted that the material data to be used may be that included in the notice transmitted from the national server 103, or may be that collected by the material data processing unit 151.

Subsequently, the material data processing unit 151 checks the material data, and stands by until the material data is updated (Step STE3). The material data includes the global earthquake situation data 113, the situation data (traffic situation data 117, first district earthquake situation data 129, and second district earthquake situation data 135), the guidelines for action data (guidelines for action data 119, first district guidelines for action data 131, and second district guidelines for action data 137), and the schedule data (schedule data 121, first district schedule data 133, and second district schedule data 139).

After the material data is updated, the material data processing unit 151 collects the material data. The dynamic data processing unit 153 divides the material data into groups (Step STE4). After the material data is divided into multiple groups, the dynamic data processing unit 153 generates the dynamic data for each group (Step STE5). The index data processing unit 155 generates the index data for each group (Step STE6). The program production unit 149 generates a program for each group using the basic script and the dynamic data (Step STE7).

The program production unit 149 judges whether or not the program generation is to be completed (Step STE8). When the program generation is to be completed, the flow returns to Step STE1. Otherwise, the flow returns to Step STE3.

Description will be made with reference to FIG. 4C regarding an example of the operation of each playback apparatus. The playback apparatus shown in FIG. 3 has the same configuration as that of the playback apparatus 5 shown in FIG. 1, thereby enabling collection of environment data, selection of a program, playback of a program, etc.

Upon receiving notice of an emergency program from the program production unit 149, the playback apparatus judges whether or not the emergency program is to be played back (Step STF1). When judgment has been made that the emergency program is not to be played back, a normal program is played back. When judgment has been made that the emergency program is to be played back, the playback apparatus plays back the program generated in Step STE2 based on the basic script (Step STE2). The playback apparatus updates the environment data (Step STF3). After the program production apparatus 109 divides the material data into multiple groups so as to generate multiple programs, the playback apparatus makes a comparison between the index data and the environment data so as to select a program (Step STF4), and plays back the program thus selected (Step STF5).

The playback apparatus judges whether or not the playback of the emergency program is to be completed (Step STF6). When judgment has been made that the playback of the emergency program is to be completed, the flow returns to Step STF1. When judgment has been made that the emergency program is not to be completed, the flow returns to Step STF3.

Description will be made with reference to FIG. 4D regarding an example of the programs generated by the program production apparatus 109 and a program selected and played backed by the playback apparatus.

It is anticipated that a single program will be generated based on the material data for some time after the occurrence of an earthquake (see "basic program" in FIG. 4D). The Step STE2 stage is immediately after the occurrence of an earthquake. In this stage, typically, the global earthquake situation data 113 is updated. However, typically, there is substantially no information with respect to the occurrence of the earthquake in the traffic server 105 and the municipal server 107. Accordingly, it is anticipated that the program mainly provides an explanation of the global earthquake situation data 113 configured as the first basic script portion. That is to say, a program is played back for providing an announcement such as "An earthquake has occurred. Please take action to protect yourself". It is anticipated that each playback apparatus will repeatedly play back this program.

The same can be said of Steps STE4 to STET. That is to say, it is anticipated that mainly the global earthquake situation data 113 will be updated for some time. In this stage, it is anticipated that the information with respect to the epicenter, the seismic intensity, or the like will be enhanced. Accordingly, there will still be a single group. That is to say, it is anticipated that a program will be played back for providing an announcement such as "An earthquake has occurred with an epicenter in XX prefecture and a maximum seismic intensity of Y. There is a possibility of the occurrence of aftershocks. Please take action as a precaution".

It is anticipated that the disaster situation will gradually become evident for each area. As a result, it is anticipated that the information with respect to the traffic server 105 and the information with respect to the municipal server 107 will be enhanced. For example, information with respect to a power failure of a traffic light at an intersection is a matter of life or death for a person driving an automobile in that direction. In contrast, for persons staying at home, information with respect to a fire or the like in the neighborhood is important for making a judgment of whether to stay home or leave home. As described above, there is a difference in the importance level of information according to the environments in which individuals are positioned.

After the material data with respect to the traffic server 105 and the material data with respect to the municipal server 107 are updated, the material data processing unit 151 compares the material data thus updated so as to group the data. Furthermore, the program production unit 149 generates various kinds of programs. In FIG. 4D, first, the material data processing unit 151 groups the material data into information with respect to the traffic server 105 and information with respect to the municipal server 107, so as to generate a program (mobile device program) that mainly provides information with respect to the traffic server 105 and a program (fixed device program) that mainly provides information with respect to the municipal server 107. Subsequently, the material processing unit 151 makes a comparison between the first district data 125 and the second district data 127. When there is a difference between them that is equal to or greater than a reference value, the material data is newly grouped, so as to generate a program (first district program) that mainly provides the first district data and a program (second district program) that mainly provides the second district data. Furthermore, the material data processing unit 151 makes a comparison of the guidelines for action data between information with respect to personal action (e.g., information to be used for judgement of whether or not the user is to escape to a shelter) and information with respect to the public action (e.g., information to be used for the action after the user escapes to a shelter). When a difference has occurred between them, the material data processing unit 151 newly groups the material data so as to generate private device programs (first district private device program and second district private device program) and public device programs (first district public device program and second district public device program) for each district.

The playback device uses the environment data and the index data to select and play back a program generated by the program production apparatus 109.

For example, a first district private home playback apparatus 106 is a playback device installed in a private home that exists in the first district. In this case, the environment data specifies that the playback device is installed as a stationary device in the first district and is privately used, for example. It is anticipated that the following operation will be performed. That is to say, first, only a single "basic program" is played back. Furthermore, based on the index data, a "stationary device program" that matches a "device used as a stationary device" is selected and played back. Subsequently, based on the index data, a "first district program" that matches a "device used as a stationary device in the first district" is selected and played back. Furthermore, based on the index data, a "first private device program" that matches a "device privately used as a stationary device in the first district" is selected and played back. The same can be said of the other playback devices. This allows each playback apparatus to play back programs suitable for an environment in which the playback device exists, using various kinds of programs generated by the program production apparatus 109.

Similarly, the shelter playback apparatus 165 in the first district is used as a playback device installed in a shelter that exists in the first district. In this case, the environment data specifies that the playback device is installed as a stationary device in the first district and is used as a public device, for example. It is anticipated that the following operation will be performed. That is to say, first, only a single "basic program" is played back. Furthermore, based on the index data, a "stationary device program" that matches a "device used as a stationary device" is selected and played back. Subsequently, based on the index data, a "first district program" that matches a "device used as a stationary device in the first district" is selected and played back. Furthermore, based on the index data, a "first public device program" that matches a "device publicly used as a stationary device in the first district" is selected and played back.

Similarly, the mobile playback apparatus 167 in the first district is used as a mobile playback device that exists in the first district. In this case, the environment data specifies that the playback device is a mobile device that exists in the first district, for example. It is anticipated that the following operation will be performed. That is to say, first, only a single "basic program" is played back. Furthermore, based on the index data, a "mobile device program" that matches a "device used as a mobile device" is selected and played back. Subsequently, based on the index data, a "first district mobile device program" that matches a "device used as a mobile device in the first district" is selected and played back.

The private home playback apparatus 169, the shelter playback device 171, and the mobile playback apparatus 173 in the second district also perform playback operations that are similar to those of the private home playback apparatus 163, the shelter playback apparatus 165, and the mobile playback apparatus 167 in the first district, respectively. Specifically, first, only a single "basic program" is played back. Subsequently, a difference occurs in the selection of the program between them. That is to say, the private home playback apparatus 169, the shelter playback device 171, and the mobile playback apparatus 173 select and play back the "second district private device program", the "second district public device program" and the "second district mobile program", respectively.

As described above, this allows each playback apparatus to play back a program suitable for an environment in which it is positioned, using various kinds of programs generated by the program production apparatus 109.

It should be noted that, when the user is to rescue an elderly person who resides in the second district, an explanation of the disaster situation in the second district is suitably provided even if the playback device is used in the first district, for example. As described above, the environment data collected by the playback apparatus may not be static data. That is to say, the environment data may be dynamic data that is changed according to conversation of the user or an instruction from the user.

Also, the present invention is not restricted to an arrangement in which each playback apparatus always plays back an emergency program when an earthquake has occurred anywhere in the country. Also, an arrangement may be made in which each playback apparatus receives at least an emergency program including information with respect to the district in which the playback device is positioned according to an instruction from the user or the like (see Step STF1). For example, each playback apparatus automatically sets the district in which it is positioned. In addition, each playback apparatus sets an additional district according to an instruction from the user. With this, when an earthquake has occurred in the district in which the playback apparatus is positioned or the additional district selected according to an instruction from the user, the playback apparatus plays back an emergency program. Also, when an earthquake has occurred with a seismic intensity of level 4 or higher, the playback apparatus may receive an emergency program even if the earthquake has occurred in the other district. In this case, the number of loops of the program playback may be reduced.

Figure 5:
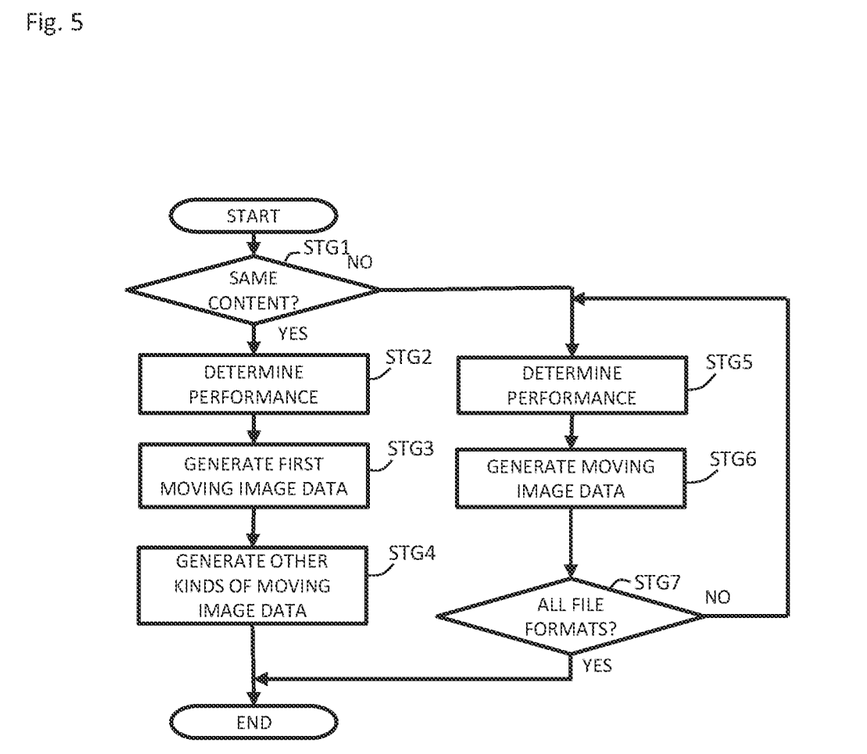
FIG. 5 is a flowchart for explaining another example of the operation of a program production unit 21 according to an embodiment of the present invention.

FIG. 5 is a flowchart for explaining another example of the operation of the program production unit 21 according to an embodiment of the present invention. In this example, the program production unit 21 determines the performance of a character, and generates a program using the character.

The material data storage unit 13 stores the performance data to be used by the program production unit to determine the performance. For example, the performance data includes information for analyzing emotion information with respect to a character or the like in the program production data (specification of lines spoken by or movement of the character, information with respect to material to be presented together with the character, etc.), information for specifying movement of the character for expressing a particular emotion (facial expression, gesture, etc.), information for specifying the shape of the mouth when the character speaks lines to express a particular emotion, information with respect to intonation when the character speaks lines to express a particular emotion, information with respect to the effects or the like of background music (BGM) or sounds to express a particular emotion, etc.

The program production unit 21 analyzes the information with respect to emotion to be expressed or the like with reference to the basic script and the dynamic data, so as to determine the performance of movements of and lines spoken by the character, BGM, sound effects, or the like (see Patent document 1 or the like). It should be noted that the performance may include lighting, camera position, etc.

The material data storage unit 13 stores material data to be used by a moving image generating unit 7 to generate moving image data. The material data includes information for specifying the shape of the character, voice information to be used for speaking lines, sound information with respect to the BGM, sound effects, etc., for example.

The program production unit 21 generates moving image data according to the performance thus determined using the data stored in the material data storage unit 13. The program data storage unit 19 stores the program data generated by the program production unit 21.

In the present example, the program production unit 21 stores N (N represents an integer of 2 or more) items of moving image data in different respective file formats. The moving image data in the n-th file format (n represents an integer from 1 to N) will be referred to as the "n-th program data". Description will be made below regarding an example in which N=3.

The first moving image data is configured as moving image data relating to an operating system (OS) of a computer that provides the program production apparatus 3. For example, in a case in which the operating system (OS) is Windows (trademark), the first moving image data is configured in a Windows media format or the like. It can be anticipated that the processing for generating the moving image data in such a file format can be provided in a simple manner on a PC with Windows as its OS.

The second moving image data is configured in a file format such as the MP4 video file format or the like, for example, which is generally used to distribute program data via the Internet. Typically, in order to reduce the file size, the second moving image data is configured to have a reduced amount of information as compared with the first moving image data.

The third moving image data is configured in a file format that conforms to the standards defined for each industry. For example, the third moving image data is configured as moving image data in the MXF file format employed in the broadcasting industry. In the MXF file format, various kinds of specifications are defined. For example, the sound volume range is determined such that there is not a large difference in the sound volume between programs. Also, the caption display region is determined so as to allow captions to be appropriately displayed on TV or the like. Such specifications are not determined in either the first moving image data or the second moving image data.

Typically, the first moving image data and the second moving image data each have no restrictions due to standards. Accordingly, after the first moving image data suitable for the OS is generated, the first moving image data thus generated is converted into the second moving image data, thereby obtaining the first moving image data and the second moving image data.

In contrast, in a case in which the third moving image data is used for broadcasting on TV, for example, the generation of the third moving image data requires a change of the sound volume, a change of the caption display method, etc., such that they meet the MXF file format standard. Typically, simple conversion is insufficient to generate the third moving image data, and changes are made manually so as to meet the standards. As a result, even after the generation of the first moving image data, in actuality, it has been difficult to convert the first moving image data into the third program data to be used in live broadcasting on TV.

It is conceivable that, after the third moving image data is generated, the third moving image data is converted into the first moving image data and the second moving image data. However, the MXF file format has its own restrictions for sound, captions, etc. This leads to the first moving image data and the second moving image data having unnecessary restrictions.

The present inventor has focused attention on the fact that the file format of the moving image data relates to the distribution/broadcasting environment or the environment in which viewers view the moving image data. For example, it is conceivable that there is a large difference in the speed at which a presenter speaks between a TV program and an environment in which a presenter speaks in front of an audience, i.e., on a stage or the like. Similarly, in a case in which moving image data suitable for viewing on the Internet is played back on TV as it is, there is a high probability that contemporary viewers will view the moving image data with a sensation of discomfort. In the present example, the moving image generating unit 7 generates the moving image data using the performance determined by the program production unit 21 giving consideration to the file format of the moving image data to be generated. This allows the moving image data to be generated such that it reflects the viewer's viewing environment while reducing the work of broadcasters, etc.

It should be noted that, in some cases, depending on the program, it is preferable to allow the same content as that of the moving image data distributed via the Internet to be viewed on TV or the like, as in a case of simultaneous distribution and broadcasting. In order to support such a function, the present example is configured to allow the creator to instruct the program production apparatus 3 to generate moving image data having common content in multiple file formats. In this case, the program production unit 21 generates moving image data having common content while satisfying restrictions required by the respective file formats.

The manager of the program production apparatus 3 inputs, via an unshown input unit, at least output specification data that specifies a file format to be output. Description will be made assuming that the output specification data is generated as an instruction to generate moving image data in the MP4 video file format and in the MXF file format. Description will be made regarding a case in which the creator specifies the generation of moving image data having common content in multiple file formats and a case in which the creator does not make such a specification.

The program production unit 21 judges whether or not the output specification data specifies the generation of moving image data having common content (Step STG1).

Description will be made regarding a case in which the output specification data specifies the generation of program data having common content. In this case, judgement of "YES" is made in Step STG1.

The program production unit 21 determines a performance that is common to the multiple file formats (Step STG2).

The program production unit 21 generates the first moving image data according to the performance thus determined (Step STG3).

The program production unit 21 converts the first moving image data into the second moving image data and the third moving image data (Step STG4). The first moving image data can be converted into the second moving image data by typical file format conversion. In the processing for conversion into the third moving image data, the program production unit 21 adjusts the sound volume of the first sound data and the display position at which the caption data is to be displayed so as to meet a standard. This allows the first moving image data, the second moving image data, and the third moving image data to have content using a common performance.

It should be noted that the moving image data may be generated in multiple file formats based on the same performance. In this case, multiple items of moving image data may be generated in parallel.

Description will be made regarding a case in which the output specification data does not specify the generation of program data having common content. In this case, judgement of "NO" is made in Step STG1.

The program production unit 21 determines the performance for the second moving image data (Step STG5).

The program production unit 21 generates the first moving image data according to the performance thus determined. The program production unit 21 converts the first moving image data so as to generate the second moving image data (Step STG6).

The program production unit 21 judges whether or not the moving image data has been generated in all the file formats (Step STG7). When judgement has been made that the moving image data has been generated in all the file formats, the processing ends. When there is any file format that has not been generated, the flow returns to Step STG5.

In this case, the third moving image data has not been generated. Accordingly, judgment of "NO" is made, and the flow returns to Step STG5.

The program production unit 21 determines a performance for the third moving image data (Step STG5).

The program production unit 21 generates the first moving image data according to the performance thus determined so as to meet the standard of the third moving image data. The program production unit 21 converts the first moving image data so as to generate the third moving image data (Step STG6).

The program production unit 21 judges whether or not the moving image data has been generated in all the file formats (Step STG7). In this case, judgement has been made that the program data has been generated in all the file formats. Accordingly, the processing ends.

It should be noted that, for example, the program data storage unit 19 may be configured to store the same moving image data generated in the same file format with different compression rates as different moving image data. Also, the multiple items of moving image data may be generated in parallel.

REFERENCE SIGNS LIST 1, 51, 101 program production system, 3, 55, 109 program production apparatus, 5 playback apparatus, 11, 81, 141 basic script storage unit, 13 material data storage unit, 15, 82, 143 dynamic data storage unit, 17, 145 index data storage unit, 19, 83, 147 program data storage unit, 21, 71, 149 program production unit, 23, 73, 151 material data processing unit, 25, 75, 153 dynamic data processing unit, 27, 155 index data processing unit, 29, 79, 157 program playback unit, 31 environment data processing unit, 33 program selection unit, 35 program playback unit, 53 material server data, 57 image capture apparatus, 59 display apparatus, 61 material data storage unit, 63 image capture data receiving unit, 65 first captured image data, 67 second captured image data, 77 input unit, 85 first program data, 87 second program data, 89 third program data, 91 fourth program data, 93 fifth program data, 103 national server, 105 traffic server, 107 municipal server, 111 global storage unit, 112 national server processing unit, 113 global earthquake situation data, 115 traffic storage unit, 116 traffic server processing unit, 117 traffic situation data, 119 guidelines for action data, 121 schedule data, 123 local storage unit, 124 municipal server processing unit, 125 first district data, 127 second district data, 129 first district earthquake situation data, 131 first district guidelines for action data, 133 first district schedule data, 135 second district earthquake situation data, 137 second district guidelines for action data, 139 second district schedule data, 159 first district, 161 second district, 163, 169 private home playback apparatus, 165, 171 shelter playback apparatus, 167, 173 mobile playback apparatus.

The invention claimed is:

1. A program production method employed in a program production apparatus for generating a program, wherein the program production apparatus comprises:
 a basic script storage unit configured to store a basic script including a narration;
 a program production unit configured to generate program data that specifies the program;
 a dynamic data processing unit configured to adjust an expression of words of the narration in the basic script and to generate dynamic data; and
 a dynamic data storage unit configured to store the dynamic data,
 wherein the program production method comprises:
  first program data generation in which the program production unit generates first program data using at least a part of the basic script without using the dynamic data; and
  second program data generation in which the program production unit generates second program data using at least a part of the basic script and the dynamic data, wherein, before starting processing for generating the second program data, the dynamic data processing unit generates the dynamic data,
 and wherein, in the second program data generation, the program production unit generates the second program data using at least a part of the basic script and the dynamic data generated by the dynamic data processing unit.

2. The program production method according to claim 1, wherein the basic script includes a first basic script portion and a second basic script portion,
 wherein, in the first program data generation, the program production unit generates the first program data using the first basic script portion,
 and wherein, in the second program data generation, the program production unit generates the second program data using the second basic script portion and the dynamic data.

3. The program production method according to claim 2, wherein the basic script includes a first basic script portion, a second basic script portion, and a third basic script portion,
 wherein, as a step following the second program data generation, the program production method comprises third program data generation in which the program production unit generates third program data using the third basic script portion without using the dynamic data,
 wherein the basic script defines a third program data playback start time point at which playback of a program specified by the third program data is to be started,
 wherein the dynamic data specifies at least a second program data playback start time point at which a program specified by the second program data is to be started,
 and wherein, in the second program data generation, the program production unit changes a playback time according to the second program data playback start time point and the third program data playback start time point so as to generate the second program data.

4. The program production method according to claim 1, wherein the dynamic data comprises first dynamic data and second dynamic data that differs from the first dynamic data,
 and wherein, in the second program data generation, the program production unit generates first local program data using at least a part of the basic script and the first dynamic data, and generates second local program data using at least a part of the basic script and the second dynamic data.

5. The program production method according to claim 4, wherein the program production apparatus comprises:
 a program playback unit configured to transmit the program data to a playback apparatus; and
 an index data processing unit configured to generate first index data that specifies a feature of the first local program data and second index data that specifies a feature of the second local program data,
 wherein the playback apparatus comprises:
  an environment data processing unit configured to collect environment data; and
  a program selection unit,
 wherein the program selection unit makes a comparison between the first index data, the second index data, and the environment data, so as to select one from among the first local program data and the second local program data, and wherein the program playback unit transmits the program data selected by the program selection unit to the playback apparatus.

6. The program production method according to claim 1, wherein the program production unit generates a plurality of items of the second program data, and wherein the program production unit generates a different kind of the second program data according to a file format of the second program data to be generated.

7. The program production method according to claim 6, wherein the program production unit generates the program using a character, and wherein, in the second program data generation, the program production unit adjusts a movement of the character and/or adjusts at least one from among a line to be spoken by the character, BGM, and sound effects, according to the file format of the second program data, so as to generate the second program data.

8. The program production method according to claim 7, wherein, in the second program data generation, when a creator makes an instruction not to make adjustment according to the file format, the program production unit generates the second program data using a performance that is common to a plurality of file formats, and wherein, in the second program generation, when the creator makes an instruction to make adjustment according to a file format, the program production unit adjusts a movement of the character and/or adjusts at least one from among a line to be spoken by the character, BGM, and sound effects, according to each file format, so as to generate the second program data.

9. The program production method according to claim 8, wherein, when the creator makes an instruction not to make an adjustment according to the file format, the program production unit generates basic second moving image data in a file format that relates to an operating system of a computer that provides the program production apparatus using the performance, and converts the basic second moving image data so as to generate the second moving image data in another file format.

10. A program production apparatus configured to generate a program, the program production apparatus comprising:
 a basic script storage unit configured to store a basic script including a narration;
 a program production unit configured to adjust an expression of words of the narration in the basic script and to generate program data that specifies the program;
 a dynamic data processing unit configured to generate dynamic data; and
 a dynamic data storage unit configured to store the dynamic data,
 wherein the program production unit generates first program data using at least a part of the basic script without using the dynamic data;
 wherein the program production unit generates second program data using at least a part of the basic script and the dynamic data,
 wherein the dynamic data processing unit generates the dynamic data in a period of time from a time point at which the program production unit starts processing for generating the first program data to a time point at which the program production unit starts processing for generating the second program data, and wherein the program production unit generates the second program data using at least a part of the basic script and the dynamic data generated by the dynamic data processing unit.

11. The program production apparatus according to claim 10, wherein the basic script includes a first basic script portion and a second basic script portion,
 wherein the program production unit generates the first program data using the first basic script portion,
 and wherein the program production unit generates the second program data using the second basic script portion and the dynamic data.

12. The program production apparatus according to claim 11, wherein the basic script includes a first basic script portion, a second basic script portion, and a third basic script portion,
 wherein, after the program production unit generates the second program data, the program production unit generates third program data using the third basic script portion without using the dynamic data,
 wherein the basic script defines a third program data playback start time point at which playback of a program specified by the third program data is to be started,
 wherein the dynamic data specifies at least a second program data playback start time point at which a program specified by the second program data is to be started,
 and wherein the program production unit changes a playback time according to the second program data playback start time point and the third program data playback start time point so as to generate the second program data.

13. The program production apparatus according to claim 10, wherein the dynamic data comprises first dynamic data and second dynamic data that differs from the first dynamic data,
 and wherein the program production unit generates first local program data using at least a part of the basic script and the first dynamic data, and generates second local program data using at least a part of the basic script and the second dynamic data.

14. The program production apparatus according to claim 13, wherein the program production apparatus comprises:
 a program playback unit configured to transmit the program data to a playback apparatus; and
 an index data processing unit configured to generate first index data that specifies a feature of the first local program data and second index data that specifies a feature of the second local program data,
 wherein the playback apparatus comprises:
 an environment data processing unit configured to collect environment data; and
 a program selection unit,
 wherein the program selection unit makes a comparison between the first index data, the second index data, and the environment data, so as to select one from among the first local program data and the second local program data,
 and wherein the program playback unit transmits the program data selected by the program selection unit to the playback apparatus.

15. The program production apparatus according to claim 14, wherein the program production unit generates a plurality of items of the second program data, and wherein the program production unit generates a different kind of the second program data according to a file format of the second program data to be generated.

16. The program production apparatus according to claim 15, wherein the program production unit generates the program using a character, and wherein the program production unit adjusts a movement of the character and/or adjusts at least one from among a line to be spoken by the character, BGM, and sound effects, according to the file format of the second program data, so as to generate the second program data.

17. The program production apparatus according to claim 16, wherein, when a creator makes an instruction not to make adjustment according to the file format, the program production unit generates the second program data using a performance that is common to a plurality of file formats, and wherein, when the creator makes an instruction to make adjustment according to a file format, the program production unit adjusts a movement of the character and/or adjusts at least one from among a line to be spoken by the character, BGM, and sound effects, according to each file format, so as to generate the second program data.

18. The program production apparatus according to claim 17, wherein, when the creator makes an instruction not to make an adjustment according to the file format, the program production unit generates basic second moving image data in a file format that relates to an operating system of a computer that provides the program production apparatus using the performance, and converts the basic second moving image data so as to generate the second moving image data in another file format.

19. A computer-readable recording medium that records a program for instructing a computer to function as the program production apparatus according to claim 10.

* * * * *